Oct. 21, 1969  D. B. COON  3,474,200

CARD-ACTUATED PROGRAMMING DEVICE

Filed Dec. 5, 1966  9 Sheets-Sheet 2

INVENTOR.
Donald B. Coon
BY
J. D. Douglas
His atty

Oct. 21, 1969 D. B. COON 3,474,200
CARD-ACTUATED PROGRAMMING DEVICE
Filed Dec. 5, 1966 9 Sheets-Sheet 3

INVENTOR.
Donald B. Coon
BY

Oct. 21, 1969       D. B. COON       3,474,200
CARD-ACTUATED PROGRAMMING DEVICE
Filed Dec. 5, 1966                   9 Sheets-Sheet 4

INVENTOR.
Donald B. Coon
BY
J. V. Douglass
his atty

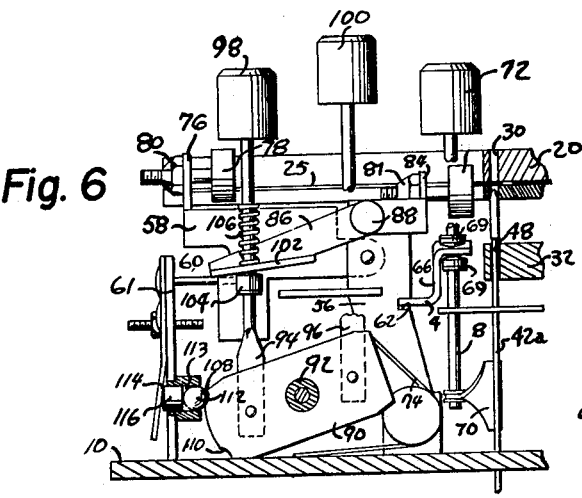

INVENTOR.
Donald B. Coon

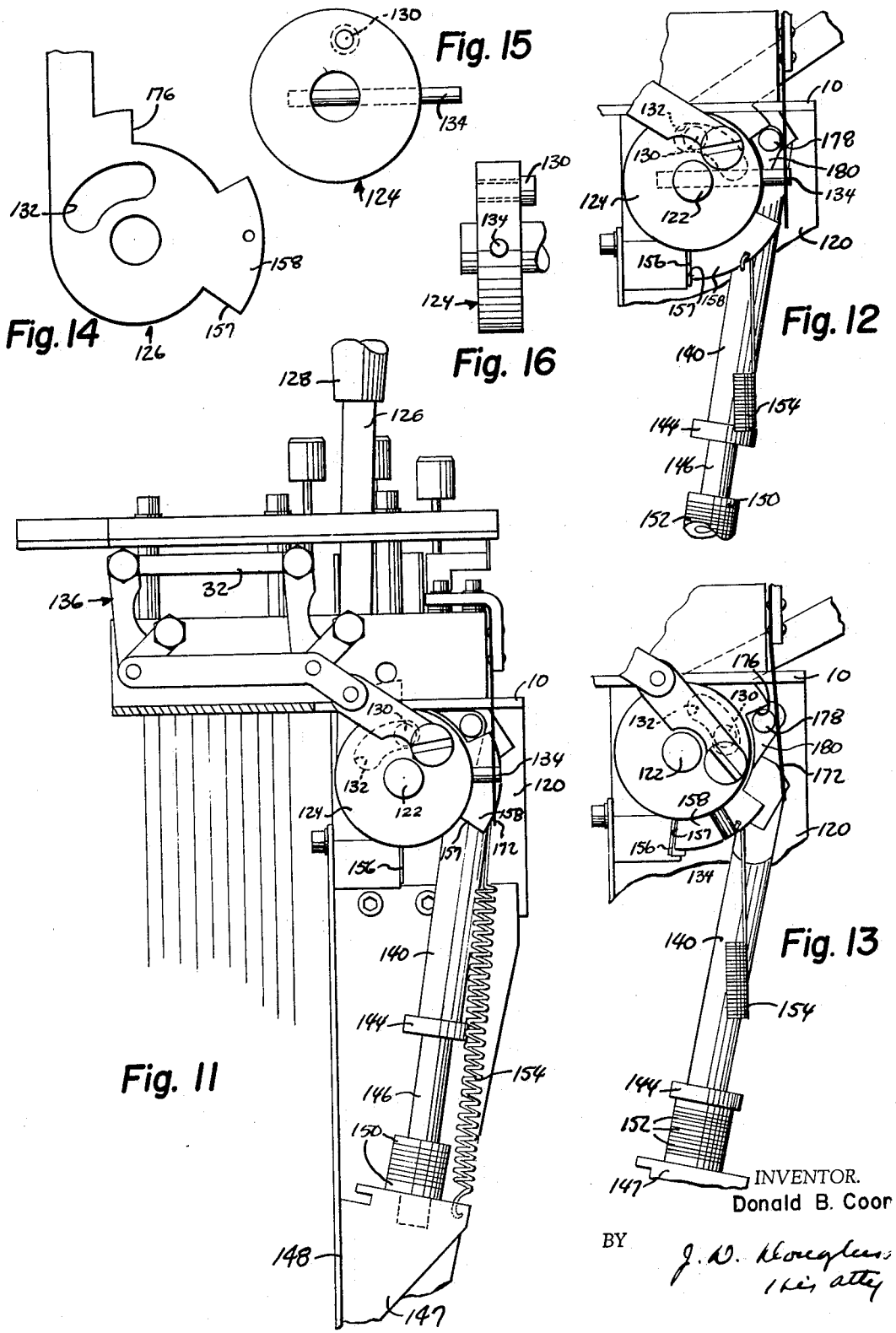

Oct. 21, 1969     D. B. COON     3,474,200

CARD-ACTUATED PROGRAMMING DEVICE

Filed Dec. 5, 1966     9 Sheets-Sheet 8

INVENTOR.
Donald B. Coon

BY *J. W. Douglas*
*his atty*

Oct. 21, 1969  D. B. COON  3,474,200

CARD-ACTUATED PROGRAMMING DEVICE

Filed Dec. 5, 1966  9 Sheets-Sheet 9

INVENTOR.
Donald B. Coon
BY J. W. Douglas
his atty

# United States Patent Office 3,474,200
Patented Oct. 21, 1969

3,474,200
CARD-ACTUATED PROGRAMMING DEVICE
Donald B. Coon, Warrensville Heights, Ohio, assignor to Western Reserve Electronics Inc., Cleveland, Ohio, a corporation of Ohio
Filed Dec. 5, 1966, Ser. No. 599,074
Int. Cl. H01h 43/08
U.S. Cl. 200—46                                                    4 Claims

ABSTRACT OF THE DISCLOSURE

A punched card is supported between a pair of perforated fixed plates. A plurality of switch controlling rods are supported below the plate in columns and rows. Each rod is biased upward by a spring. A perforated retractor plate, through which the rods extend, is movable toward and away from the fixed plate. The retractor plate engages with collars on the rods to control the movement of the rods toward and from the card. When the rods move toward the fixed plate those encountering holes in the card pass through and each causes a separate switch to operate. Those that encounter imperforate parts of the card are stopped in their upward movement and their corresponding switches do not operate. Means is provided for determining the positioning of entry of the card and to hold the card in fixed position by card engaging triggers to enable one card with as many as four sets of information thereon to be used to control the switching. A mechanical interlock is provided to prevent operation of the device until the card is in a correct position.

The retractor plate can be operated manually or by a motor. When motor operated the insertion of the card causes the device to be operated and operates to a switch actuated position where it stays until a manual switch is depressed to cause the motor to retract the retractor plate.

---

This invention relates generally to switching devices and more particularly to card actuated multiple circuit selector switching devices.

According to the present invention a switching device is provided which is adapted to support a card having imperforate areas and perforate areas punched in a preselected pattern for causing switching of various switches. Actuating rods are provided which are releaseable as a group and each is individually biased toward the card. Each rod operates a switch by movement thereof. When the rods are released, as a group, those rods encountering a hole in the card will move through the hole and cause a switching action while those encountering an imperforate area of the card will not move sufficiently to cause switching. The device may either be hand operated or may be automatically operated by means of a motor.

Another aspect of the invention provides for a selector on the device which permits a single card to actuate four different programs.

Still other features of the invention together with the invention itself will become more apparent from the following description taken in conjunction with the accompanying drawings in which:

FIGURE 6 is a detailed view of the release mechanism and the mode selector mechanism;

FIGURE 7 is a view similar to FIGURE 6 with the mode selector in the opposite mode;

FIGURE 8 is a view similar to FIGURE 6 with the release mechanism in the released position;

FIGURE 11 is a partial side elevational view of the device with the drive mechanism in the actuated position;

FIGURE 12 is a detail view of the drive mechanism in a position about to release it from the actuated position;

FIGURE 13 is a detail view similar to FIGURE 12 of the drive mechanism having been released and returned to its released position;

FIGURE 14 is a detail view of a portion of the handle;

FIGURE 15 is a detail view of the drive disc;

FIGURE 16 is an end elevational view of the drive disc of FIGURE 15;

Figure 1:
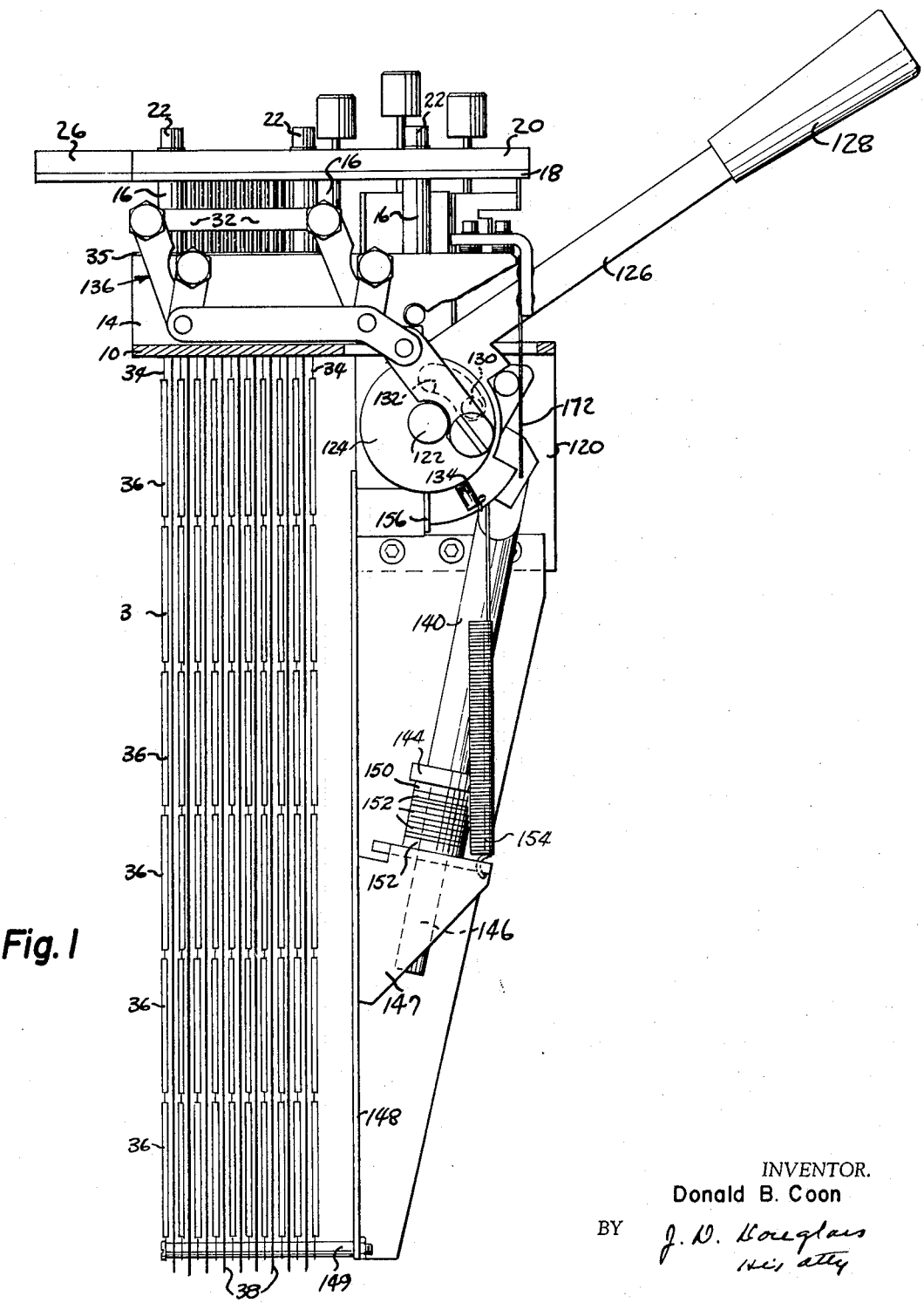
FIGURE 1 is a side elevational view, with parts broken away for clarity, of a manually operated switching device according to this invention.

Briefly, the present invention contemplates a multiple circuit card actuated switching device having a support plate to support a flat punched card and means to position the card on the plate. The plate has a plurality of apertures in each of which is slidably mounted an actuating rod. Each of the actuating rods is connected to a switch and the switches are actuated by movement of the rods. A spring biases each rod toward the plane of the card. A retractor plate is provided having holes through which the rods extend. The retractor plate has a retracted position wherein it bears against collars on the rods and maintains the ends of each of the rods in the apertures closely spaced from the card and an actuating position wherein the rods are free to move past the plane of the card under the urging or bias of the springs if the rod encounters a punched out or perforate area on the card. The switches will switch if the rods move past the plane of the card. When the retractor plate is moved to its actuating position the rods encountering perforate areas on the card will pass the plane of the card causing the respective switches to switch and those rods encountering imperforate areas of the card will be restrained from moving past the card and their switches will not switch. Hence, a preselected switching pattern can be punched into a card with each punched area representing a switching position. Either a manual handle may be provided for actuating the device with a detent to hold the retractor plate in its actuated position or a motor may be provided with proper controls to drive the retractor plate between its two positions. The switches are carried at the edges of planar boards which boards extend normal to the support plate so that each switch is easily accessible for wiring. This also permits banks of switches to be inserted as units and allows various types of switches to be used in the same unit.

Referring now to the drawings, and for the present to FIGURES 1 through 5, a manually operated card actuated multiple switching device according to this invention is shown.

CARD SUPPORTING STRUCTURE

The device includes a mounting plate 10 which is provided with a central opening 12. A pair of support rails 14 are secured to the top of the mounting plate 10 by screws (not shown). Three guide and support posts 16 extend from each of the support rails 14. The guide and support posts 16 support a guide plate 18 above the top of the support rails 14. Superposed upon the guide plate 18 is a top plate 20. The plates 18 and 20 are secured to the guide and support posts 16 by cap screws 22, extending through the posts and threaded into the rails 14. The top plate 20 is provided with a longitudinal channel 24 which channel together with the top of the guide plate 18 defines a card receiving slot 25. A card entry guide 26, formed as a part of the top plate 20, extends outwardly therefrom and provides means for guiding a card C into the card receiving slot 25.

The guide plate 18 is provided with a series of apertures 28 which are arranged in straight rows and columns. The top plate 20 is also provided with a series of apertures 30 corresponding to and in alignment with the apertures 28 in the guide plate.

A retractor plate 32 is provided between the guide plate 18 and the mounting plate 10. The retractor plate 32 is slidably mounted on four of the guide and support posts 16.

SWITCHES

A plurality of planar switch boards 34 are suspended below the mounting plate 10. The boards have mounting ears 34′ extending therefrom and secured to the underside of the mounting plate 10 by screws (unnumbered). The boards 34 also have tabs 34″ which reside in notches (not shown) in a rectangular guide plate 35 secured to the top of rails 14 by the cap screws 22. As can best be seen in FIGURE 4, the switch boards 34 are generally trapezoidal in shape decreasing in width in steps from the top wider portion to the bottom narrowest portion and mount thereon a plurality of switch assemblies 36 at their outer edges. The switch assemblies 36 have switches 37 on both sides thereof.

Sheets of electrical insulating material 38 are interposed between adjacent boards to prevent short circuiting of the switches on the adjacent boards.

Each of the switches 37 has a moveable contact 40 carried on a non-conducting base 43 which is actuated by an actuating rod 42 secured to the base. The actuating rods 42 extend upwardly through apertures 48 in the retractor plate 32 into the apertures 28 of the guide plate 18. The apertures 48 correspond to and are aligned with the apertures 28 in the guide plate. Each of the rods is provided with a collar 50, secured thereto, beneath the retractor plate 32. Biasing springs 52 are provided which are connected between the actuating rods 42 and the switch boards 34 normally urging the rods 42 upwardly as viewed in FIGURES 1, 4 and 5.

SWITCH ACTUATION

Figure 4:
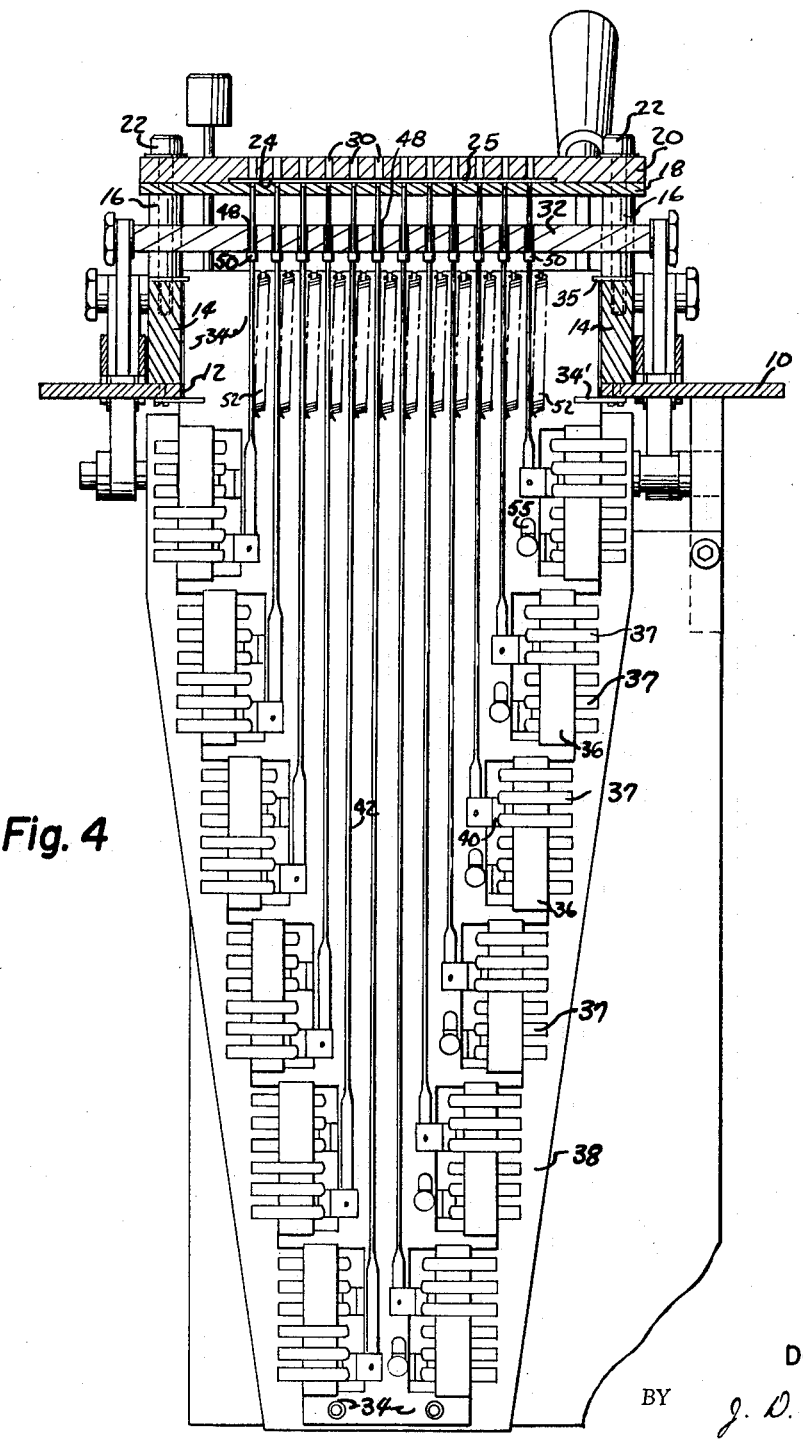
FIGURE 4 is a sectional view taken substantially along the plane designated by the line 4—4 of FIGURE 2.
Figure 5:
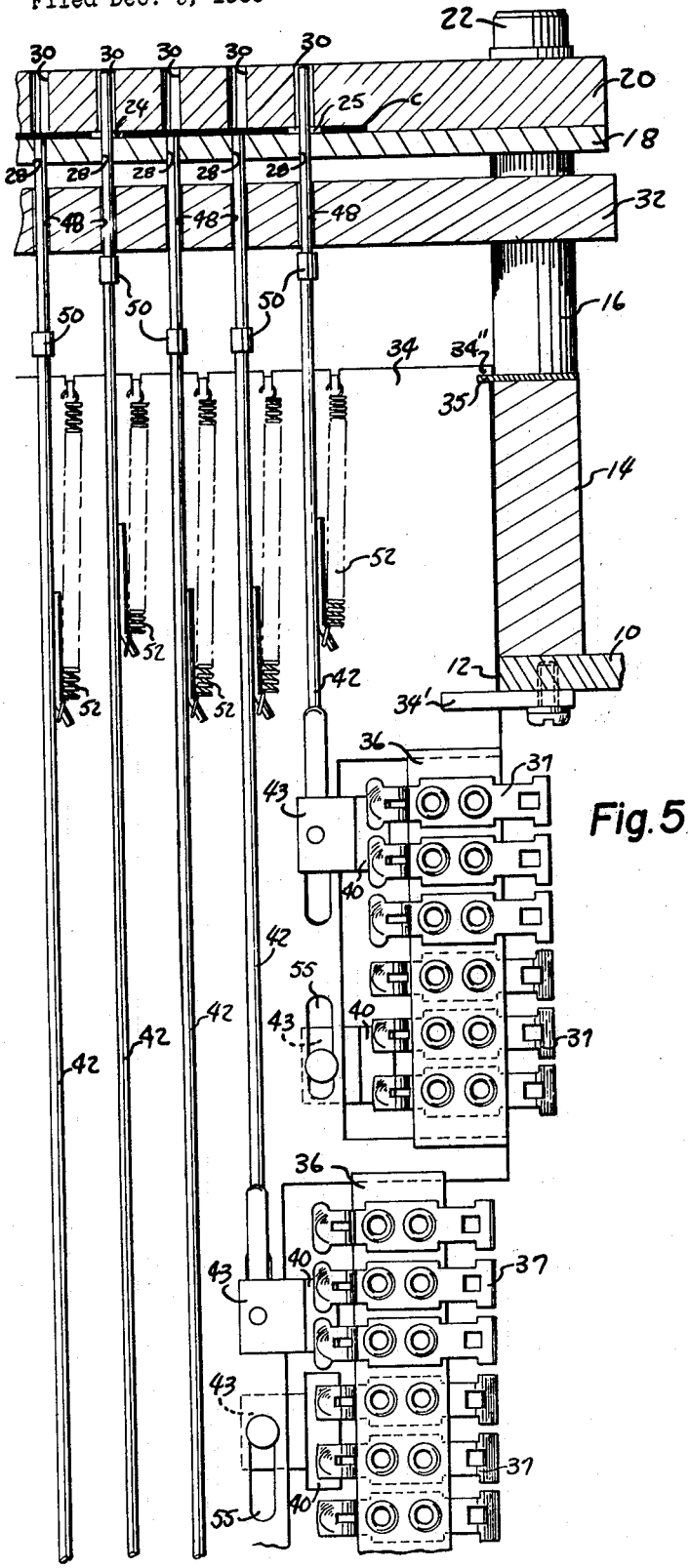
FIGURE 5 is an enlarged fragmentary detail view partially in section of the actuating rods and switches.
Figure 9:
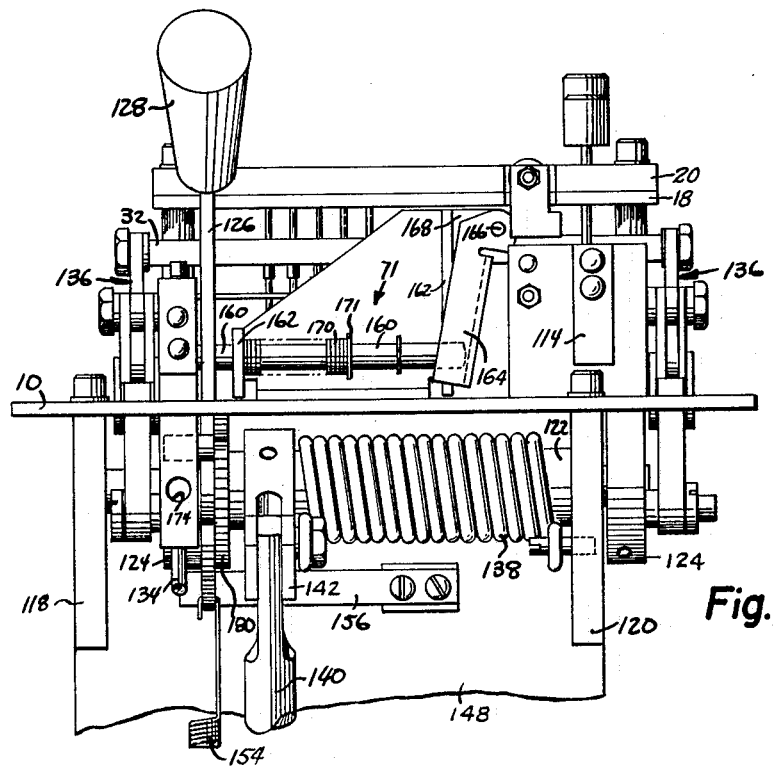
FIGURE 9 is a partial rear elevational view of the device with the release mechanism in the locked position.
Figure 10:
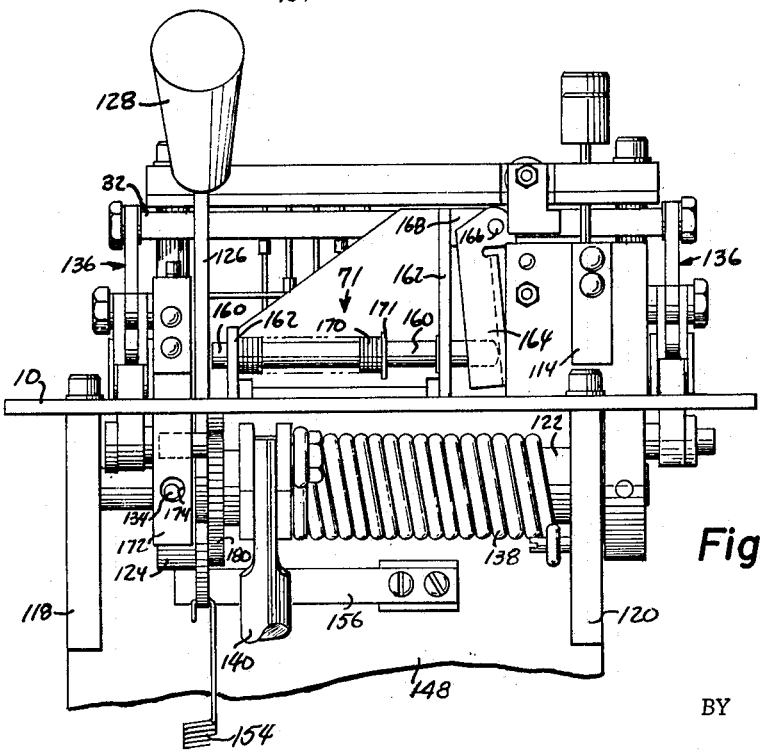
FIGURE 10 is a view similar to FIGURE 9 with the release mechanism in the released position.

As was indicated previously the retractor plate 32 is slidably mounted on the posts 16 and is moveable between a normally retracted downward position, shown in FIGURES 1, 4 and 9, and an actuated upward position shown in FIGURES 5, 10 and 11. When the retractor plate 32 is in its retracted position the collars 50 abut the underside of the retractor plate 32 and the ends of the rods are positioned in the apertures 28 below but closely spaced from the upper surface of the guide plate 18. This can best be seen in FIGURE 4. When the retractor plate is moved to its actuating position, as shown in FIGURE 5, the bias of the springs 52 will cause the rods to move upwardly until they reach the plane of the card receiving slot 25. If there is no obstruction in the slot, in the path of of a given rod, the rod will continue its upward motion under the urging of the biasing spring 52 into the aperture 30 in the top plate 20. If a punched card C is inserted in the card receiving slot 25, when the end of a rod 42 senses a perforate area in the card, it will continue its movement through the card as described into the apertures 30 in the top plate. However, if the end of a rod 42 encounters an imperforate area in the card, the card will block the movement of the rod preventing it from moving past the plane of the card. The switches 36, so arranged that the small amount of movement of the actuating rods 42 from their positions when the retractor plate is in the retracted position to the plane of the card, will not cause opening or closing of contacts but will merely cause a wiping of the contacts by the moveable contacts 40 to keep the controls clean and free from oxidation products. However, movement of the rods past the plane of the card into the apertures 30 in the top plate 20 will cause the switch connected to the respective rod to switch from one position to another. Hence, switching of the device is accomplished by moving the retractor plate toward the guide plate 18 and at each perforate area of a card contained in the card receiving slot 25 switching will occur, and at each imperforate area encountered by the end of a rod 42 no switching will occur. Thus, a preselected switching pattern can be punched into the card and at each punched or perforate area switching will occur and at unpunched or imperforate area switching will not occur. The actuating rods 42 can be made of metal but since they form no part of the circuit they are connected to the moveable contacts 40 of the switches 37 by the non-conducting bases 43. To provide guided action of the switches 37, headed shoulder rivets 54 are provided which interconnect the rods 42 and the bases 43 and with their shanks slidably disposed in slots 55 formed in the boards 34.

CARD POSITIONING

Referring now to FIGURES 6 through 8, the card positioning mechanism is shown which includes a card location sensor and a mode selector to enable a single card to be used for four different switching circuits or operations. The card position sensing mechanism includes a catch 56 pivotally connected to an actuating slide 58 which is slidably mounted on a guide pin 60 extending from a bracket 61 secured to the mounting rail 14. The catch 56 has a notch 62 in its forward edge (to the right) disposed to receive a horizontal extension 64 of an arm 66 secured to a pin 68 between collars 69 clipped to the pin. The pin is slidably mounted in an aperture (not shown) in the guide plate 18 and extends through an opening (also not shown) in top plate 20. The pin 68 is connected by clamp 70 to one of the switch actuating rods, hereinafter referred to as a sensing rod and designated by the reference character 42a. The sensing rod 42a is in turn connected to one of the switches, although that is not necessary. The sensing rod 42a is similar to the other actuating rods except that it does not have a biasing spring surrounding it and does not have any collar, the biasing being effected by other means. The lack of a collar makes it freely moveable in the aperture 48 in the retractor plate 32 and the biasing force is supplied by interlock spring structure 71 (see FIGURES 3, 9 and 10) which structure will be described in detail hereinafter in conjunction with the description of the interlock device. The top of the pin 68 is provided with a cap 72 which when pressed will cause the pin 68 and rod 42a to move downwardly together. A biasing spring 74 is operably connected between the mounting plate 10 and the catch 56 normally urging the catch toward the arm 66. Hence, when the button 72 is depressed, pushing the pin 68 down, the bias of the spring 74 will normally cause the catch 56 to slide with the actuating slide 58 to push the notch 62 into engagement with the horizontal extension 64 of the arm 66. This will maintain the pin 68 in its depressed position with the top of the sensing rod 42a spaced just below the card receiving slot 25 against the bias of spring structure 71.

Figure 2:
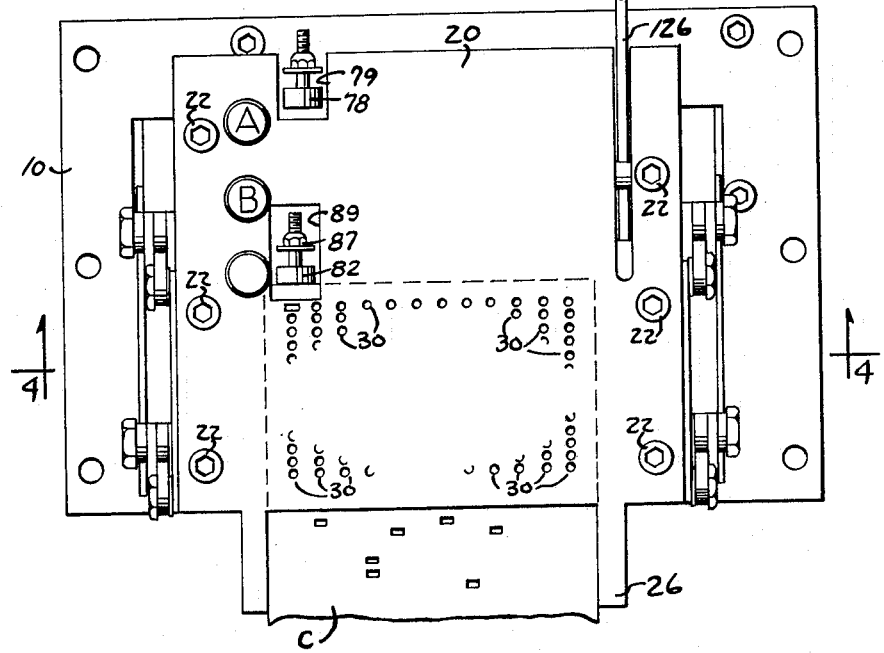
FIGURE 2 is a plan view of the device of FIGURE 1 showing a portion of a card inserted.
Figure 3:
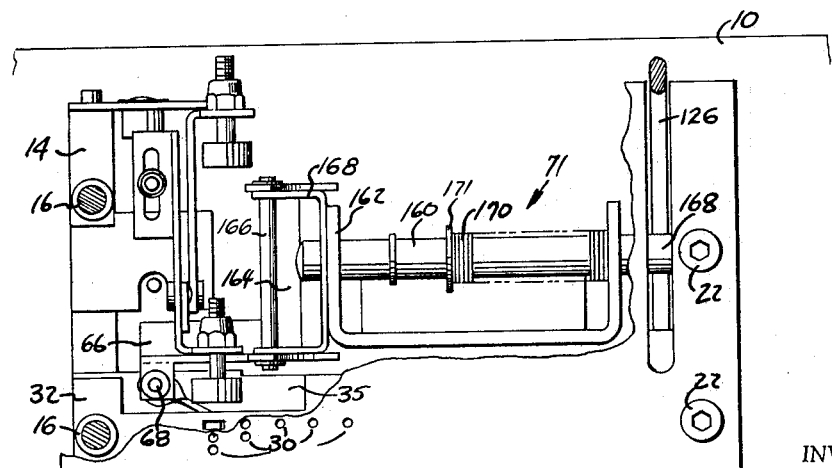
FIGURE 3 is a partial plan view similar to FIGURE 2 with parts broken away and removed.

The actuating slide 58 has a rear vertical flange 76 in which is mounted a rear stop button 78 by means of a self-locking clinch nut 80. The rear stop button 78 extends into cut-out portions 79 of top and support plates 20 and 18 (FIGURE 2). The longitudinal position of the stop button 78 can be changed by threading the button 20 in the clinch nut 80 to the selected position. A forward stop button 82 also is provided which is mounted in an upturned flange 84 of pivot arm 86 by a clinch nut 87. The pivot arm 86 is pivotally mounted to the catch 56 by a pivot pin 88. The pivot arm 86 is pivotally moveable by the mode selector mechanism, to be described presently, to move the forward stop button 82 into the path of the slot 25 as shown in FIGURE 6 and out of the path of the slot 25, as shown in FIGURE 7. When the button is in the position shown in FIGURE 6 it is located in cutout portion 89 in the top and the support plates 20 and 18 (FIGURE 2).

A force applied to either the rear stop button 78 or forward stop button 82 in a direction away from the sensing rod 42a will cause the actuating slide 58 to slide on pin 60 in a direction away from the pin 68 which will move the notch 62 out of engagement with the arm 66 and allow the sensing rod 42a to be moved upwardly under the bias of spring structure 71. As was indicated previously, the rod 42a does not have a collar thereon so the rod 42a is free to slidably move in the retractor plate and is not maintained in a retracted position by the retractor plate. When the catch 56 is released from the arm 66 the bias of the spring structure 71 will cause the upward movement of the rod 42a. Appreciable upward movement is prevented if the end of the rod 42a encounters an imperforate area of the card. However, if the rod 42a encounters a perforate area it will move into the aperture 30 in the top plate exactly positioning the card and such movement past the card receiving slot 25 will actuate a drive interlock and release mechanism which will be described presently which will unlock the drive and permit the retractor plate to be raised.

MODE SELECTOR

Still referring to FIGURES 6 through 8, the mode selector mechanism includes a link bar 90 mounted for pivotal movement on a pivot pin 92 secured to one of the support rails 14. A pair of actuating pins 94 and 96 are connected to the link bar 90 on opposite sides of the pivot pin 92 and are slidably mounted in the guide plate 18 and top plate 20. The pins 94 and 96 are provided with caps 98 and 100 respectively. The actuating pin 94 passes through a generally horizontally extending flange 102 of pivot arm 86 and is provided with a collar 104 therebelow. A coil spring 106 surrounds the pin 94 and is interposed between the guide plate 18 and the flange 102. The upper and lower rear corners of the link bar 90 are provided with detent grooves 108 and 110 respectively which are disposed to be engaged by detent ball 112 located in a hollow sleeve 113 which sleeve is secured to the bracket 61. The ball 112 is normally biased toward the link bar 90 by a leaf spring 114 secured to the bracket 61 acting against plug 116 disposed in the sleeve 113. When the actuating pin 94 is depressed, as shown in FIGURE 6, the link bar 90 will be positioned for the detent ball 112 to engage the detent groove 108 and maintain the link bar in this position. In this position, the force of the spring 106 will cause the pivot arm 66 to pivot to the position shown in FIGURE 6 placing the forward stop button 82 in the path of the card receiving slot 25. Thus, if a card is inserted into the slot 25 and pushed back it will engage the forward stop button 82. Pressure exerted against the forward stop button 82 will cause the actuating slide 58 to slide in a direction away from the arm 66 on the guide pin 60 releasing the catch 56 from the arm extension 64 which will allow the rod 42a to move upwardly under the bias of its biasing spring structure 71. A positioning hole or perforate area is punched in the actuating card at a predetermined position so that if a card is properly inserted, when the actuating slide 58 has moved sufficiently to release the catch 56, the positioning hole in the card will be directly above the rod 42a which will allow the rod to move up into the aperture 30 in the top plate 20 exactly positioning the card and releasing the drive mechanism. The size of the card and the size of the device are so selected that when the card has been inserted so that its end engages the forward stop button 82 approximately one-quarter of the card will be located within the card receiving slot 25. The distance between the front stop button 82 and the rear stop button 78 is so selected so that it equals approximately one-quarter length of the card. Hence, if the actuating pin 96 is depressed it will cause the link bar 90 to pivot to the position shown in FIGURE 7 with the detent ball 112 holding the link in this position by engagement with the deten groove 110. Movement to this position will cause the actuating pin 94 to move upwardly and the collar 104 acting against the flange 102 will cause the pivot arm 86 to pivot to the position shown in FIGURE 7 causing the forward stop button 82 to pivot downwardly below the card receiving slot 25. When a card is inserted in this position, its leading edge will pass the position at which it was stopped when the forward stop button 82 was in the path of the groove and it will continue until its leading edge strikes the rear stop button 78. Pressure on this stop button 78 will cause the actuating slide 58 to slide in a direction away from the pin 68 releasing the catch 56 and allowing the actuating rod 42a to move under the bias of spring structure 71. Again, a locating hole or perforate area is punched at a preselected location in the card so that at the point the catch 56 releases the arm 66 to allow the rod 42a to move upwardly it will encounter this perforate area and move into the aperture 30 in the top plate 20 thus exactly positioning the card and releasing the drive mechanism. It will be noted that in this position the front quarter of the card has passed through the slot 25 and the second quarter of the card is positioned within the card receiving slot 25. This second quarter of the card has a different switching pattern punched therein from the first which gives two separate switching patterns on one-half of the card. The card, of course, can be turned end-for-end and two additional switching patterns can be punched, thereby allowing four separate switching patterns to be punched in a single card.

DRIVE MECHANISM

The drive mechanism for raising and lowering the retractor plate is shown in detail in FIGURES 1 and 9 through 15. The drive includes a pair of drive support plates 118 and 120 depending from the mounting plate 10 and secured thereto by cap screws (un-numbered). The drive support plates 118 and 120 journal the opposite ends of a drive support shaft 122. A pair of drive discs 124 (shown in detail in FIGURES 15 and 16) are secured near the opposite ends of the drive support shaft 122 and are rotatable therewith. A drive handle 126 is provided which is journalled on the drive support shaft 122. One end of the drive handle 126 is provided with a gripping knob 128. The drive disc 124 which is located adjacent the drive handle 126 is provided with an eccentrically mounted drive lug 130 which is disposed to move in slot 132 formed in the handle 126 (FIGURE 14) at the location where the handle is journalled on the shaft 122. The same drive disc 124 that is provided with the drive lug is also provided with a radially extending detent pin 134 (FIGURE 15). Each of the drive discs 124 is connected through pin and link to a parallelgram type linkage 136 to opposite sides of the retractor plate 32. Rotation of the drive discs in one direction will cause the retractor plate 32 to move toward the guide plate 18 and rotation in the opposite direction will cause the retractor plate to move away from the guide plate 18. The nature of this linkage is such that the retractor plate 32 will be maintained essentially parallel to the support plate 18 during movement toward and away therefrom.

Referring again to FIGURES 9 and 10, a retractor plate return spring 138 is coiled around the drive support shaft 132 and secured to the drive support plate 120. The return spring 138 normally urges the drive support shaft 122 to rotate in a clockwise direction (as viewed in FIGURES 1, 11, 12 and 13) to move the drive discs 124 in a direction which will move the retractor plate to its retracted position which position is shown in FIGURE 1 and 9. A shock absorber is provided which includes a rod 140 mounted to a clevice 142 which in turn is secured to and rotatable with the drive support shaft 122. The lower end of the rod 140 has an enlarged head 144 and a stem 146 extending therefrom through a guide bracket 147 mounted on a support bracket 148 depending from drive support plates 118 and 120. (The support bracket 148 also supports screw and sleeve assemblies 149 which assemblies pass through the lower ends of the switch board 34 and insulating sheets 38 to secure them thereto). Shock absorbing rubber rings 150 surround the stem 146 between the enlarged head 144 and the guide bracket 147 and are separated by metal discs 152. A coil spring 154 extends between the handle 126 and the guide bracket 147 and normally tends to rotate the handle in a clockwise direction (as viewed in FIGURES 11 through 13). A flat leaf spring 156 is secured to the support bracket 148 and bears against flattened edge 157 of ear 158 on the handle 126, against the bias of coil spring 154. The leaf spring 156 tends to drive the handle in a counter clockwise direction (as viewed in FIGURES 1 and 11 through 13). The normally retracted position of the handle and retractor plate are shown in FIGURE 1 with the leaf spring 156 urging the end of the slot 132 of the handle into engagement with the drive lug 130 on the drive disc 124. The biasing force of spring 156 is greater than the force of spring 154 but less than the force of spring 138, thus positively positioning the handle 126.

INTERLOCK

As was indicated above, the pin 68 operates a drive interlock and release mechanism responsive to movement of the sensing rod 42a. This drive interlock and release mechanism can best be seen in FIGURES 3, 9 and 10, and takes the form of a pin 160 slidably mounted in a bracket 162, which in turn is mounted on top of the mounting plate 10. One end of the pin 160 extends through the right side of the bracket (as viewed in FIGURES 9 and 10) and bears against the surface of depending flange 164 which is part of the arm 66 which in turn is connected to the pin 68. The arm 66 is mounted for pivotal movement by pivot pin 166 on a wall 168 secured to the bracket 162. A coil spring 170 surrounds the pin 160 and is normally in compression between a snap ring 171 on the pin 160 and the side of the bracket 162, normally urging the pin into engagement with the flange 164. This is the spring assembly 71 which normally biases the pin 68 and the rod 42a upwardly as previously described. When the pin 68 is in its depressed position and the catch 56 engages the arm 66, the depending flange 164 will be pivoted to the position shown in FIGURE 9 which in turn will slide the pin 160 into the path of the handle 126 and prevent its movement. The catch 56 engaging arm 66 will hold the arm 66 and pin 160 in this position against the bias of spring 170. Any attempted movement of the handle in a counter-clockwise direction (as viewed in FIGURE 1) will be prevented by the handle engaging the pin 160 which will prevent the raising of the retractor plate. However, as previously described, if a card is pressed against either stop button 78 or 82 it will cause slide 58 to release the catch 56 from the arm 66. This will cause the spring 170 to bias the arm 66 to pivot in a direction to cause the pin 68 to move upwardly thus urging the sensing rod 42a upwardly. If the sensing rod senses a preforate area in a card and passes there through the arm 66 will pivot about pivot pin 166 moving the flange 164 of the bracket to the position shown in FIGURE 10. In this position, the pin 160 is moved to the right under the bias of coil spring 170 out of the path of the handle so that the handle can be rotated in a counter-clockwise direction to actuate the drive mechanism and drive the retractor plate to its actuated position.

OPERATION OF DRIVE MECHANISM

With the pin 160 retracted, the drive of the retractor plate to its actuated position occurs as follows: From the position shown in FIGURE 1, rotation of the handle 126 in a counter-clockwise direction will cause the end of the slot 132 to engage drive lug 130 of the drive disc 124. This will cause rotation of the drive disc 124 which is mounted on drive support shaft 122 and therefore both drive discs 124 will be driven together. Rotation of the drive discs will raise the retractor plate through the operation of the parallelogram linkage 136 to the position shown in FIGURE 11. As was explained previously, when the retractor plate 32 is raised to this actuated position, the rods 42 under the bias of the springs 52 are urged toward the card receiving slot 25. If the end of any of the rods 42 strikes an imperforated area on the card, movement thereof past the slot 25 is prevented and no switching occurs; however, if any rod 42 encounters a perforate area or a hole in the card, the rod 42 will move past the slot into the aperture 30 in the top plate 20 causing switching to occur. When the drive mechanism has raised the retractor plate to this actuating position it will be locked therein by the action of a flat leaf spring 172 depending from rail 14 which spring has an opening therein 174 to engage the detent pin 134 on the drive disc 124. As long as the leaf spring 172 is engaging the detent pin 134, the retractor plate will be maintained in its actuating position. When the handle 126 is released from the position shown in FIGURE 11 the urging of spring 154 will cause the handle to rotate clockwise to the position shown in FIGURE 12 at which point surface 157 of the handle will bear against spring 156 which as noted above has a greater force than spring 154. This will stop the movement of the handle at this position. It will be noted that the handle can rotate without corresponding rotation of the drive disc 124 because of the slot 132 in the handle sliding with respect to drive lug 130.

In order to return the retractor plate from its actuating position shown in FIGURE 12 to its retracted position shown in FIGURE 1, movement of the handle 126 is started in the clockwise direction as viewed in FIGURE 12 against the bias of spring 156. This movement will cause flattened surface 176 of the handle to engage a lug 178 extending from a spring release disc 180 which is pivotally mounted on the drive support pin 122 independent of the handle. This clockwise rotation of the handle depressing spring 156 will cause the flattened surface 176 to rotate the disc 180 thus forcing the lug 178 thereof against the leaf spring 172 which will tend to move the leaf spring 172 to the right (as viewed in FIGURE 12) until it releases the detent pin 134 of the drive disc 124. When this detent pin 134 has been released, the urging of the return coil spring 138 will cause the drive pin 122 to rotate in a clockwise direction, thus rotating the drive discs 124 in a clockwise direction to return the retractor plate to its retracted position. Since the return spring 138 must, of necessity, store a great deal of energy to overcome the force of all of the rod biasing springs 52 and rapidly drive the retractor plate so as to quickly break the circuits, the shock absorber is provided to absorb the shock of the return drive. After the drive has been returned to its retracted position, the pin 68 is manually depressed and when depressed the spring 74 will cause the actuating arm 58 to slide forward which will allow the notch 62 in the catch 56 to engage the arm 64 of the bracket 66 and thus return the locking pin 160 to the locked position. This will also lower the end of the sensing rod 42a below the card receiving slot 25 which will allow the card to be withdrawn.

SUMMARY OF OPERATION

Summarizing the operation of the device, as described, either actuating pin 94 or 96 is depressed depending upon which mode of the card is desired to be used. The punched card is then inserted into the card receiving slot 25 and pushed to the rear until it encounters either the rear stop button 78 or the forward stop button 82 depending upon which mode has been selected. Pressure on either of the stop buttons will cause the actuating slide 58 to slide rearwardly which will cause the notch 62 on the catch 56 to disengage the arm 66. This will allow the arm 66 to pivot which will move pin 68 and the rod 42a upwardly under the bias of spring structure 71 and the rod 42a will sense a pre-punched area in the card and pass therethrough. This will also cause the spring structure to slide the pin 160 out of the path of the travel of the handle 126. The drive handle is then manually rotated in a counter-clockwise direction and the drive discs will urge the retractor plate upwardly from its retracted position to its actuated position. Movement of the retractor plate to its actuated position allows the rods 42 to be moved upwardly by virtue of the bias of their springs 52. However, the rods will move only a short way until they are at the card receiving slot 25 which movement is insufficient to cause a switching of their associated switches 37. If the end of the rods sense an imperforated area on the card no further movement will occur, the movement being restrained by the mass of the card and the switching of that particular switch will not occur, merely a wiping action of the contacts will occur. However, if the rod encounters a perforated area on the card, the rod under the urging of its spring 52 will pass through the perforated area of the card past the card receiving slot 25 and into the apertures 30 in the top plate 20. This movement will cause the associated switch to switch from one position to another. The retractor plate will be locked in this actuated position by the spring 172 engaging detent pin 134. To return the plate to its retracted position, the handle is rotated in a clockwise direction which will cause the spring 172 to be disengaged from the detent pin 134 which will allow the return drive spring 138 to return the retractor plate to its retracted position and when the pin 68 is manually depressed, the catch 56 will engage the arm 61 and the card can be removed.

MOTORIZED EMBODIMENT

Figure 17:
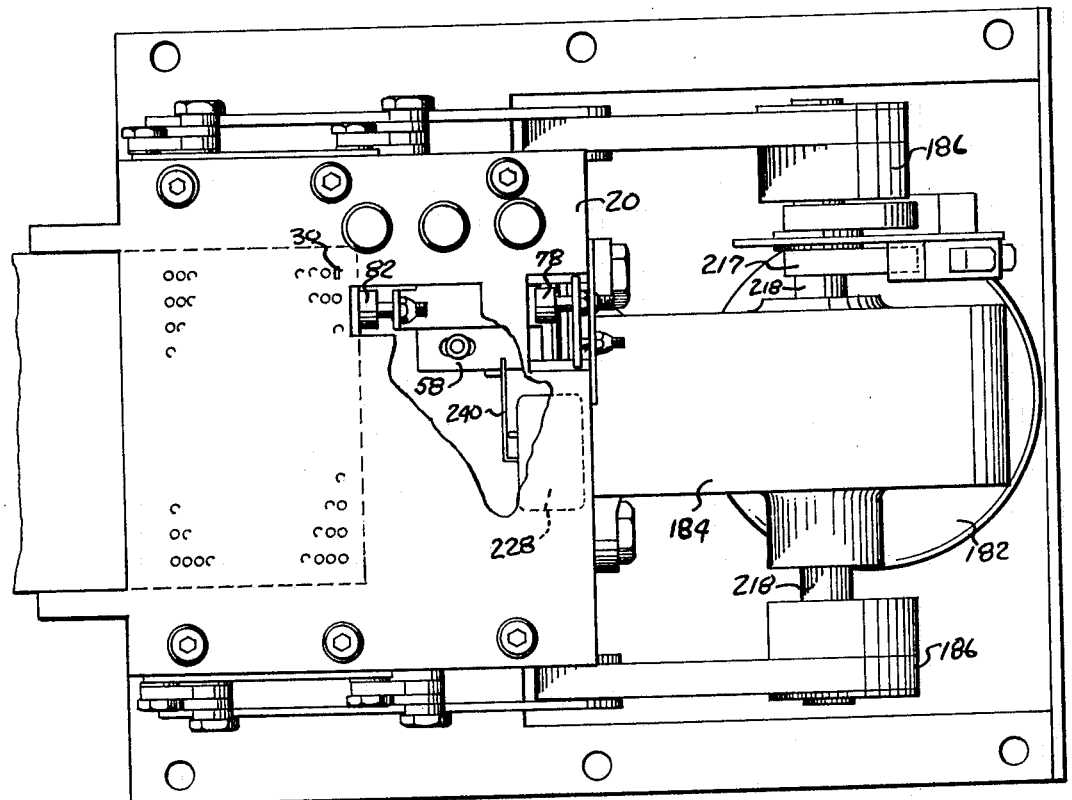
FIGURE 17 is a plan view of a motorized automatic embodiment of this invention.
Figures 19, 20:
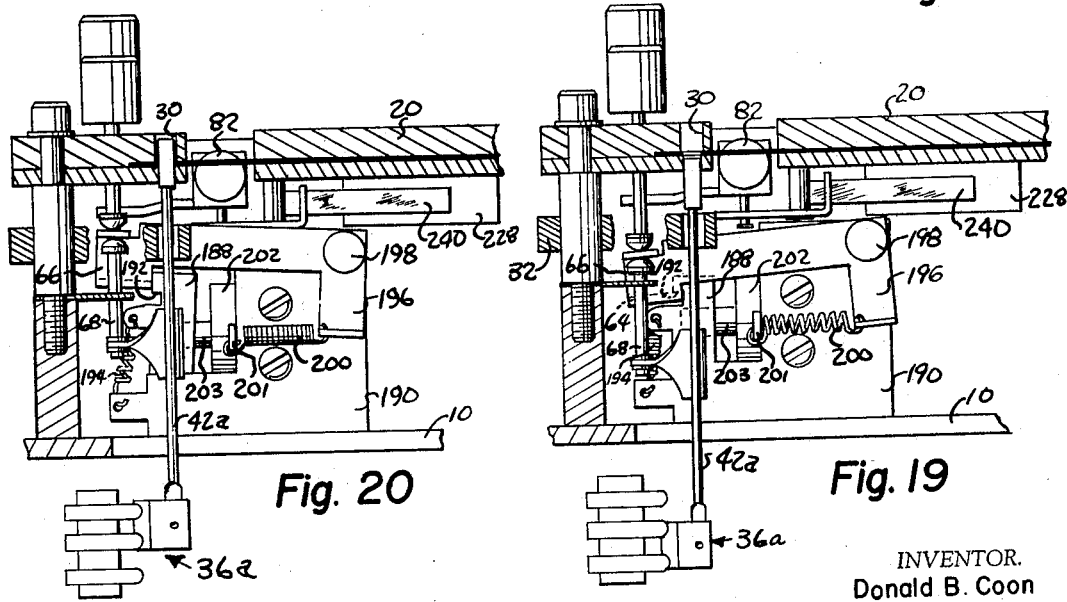
FIGURE 19 is a detail view of the drive actuating mechanism of the motorized embodiment in a position to receive a card.
FIGURE 20 is the drive actuating mechanism of FIGURE 19 in a position with a card in place and the mechanism actuated.
Figure 18:
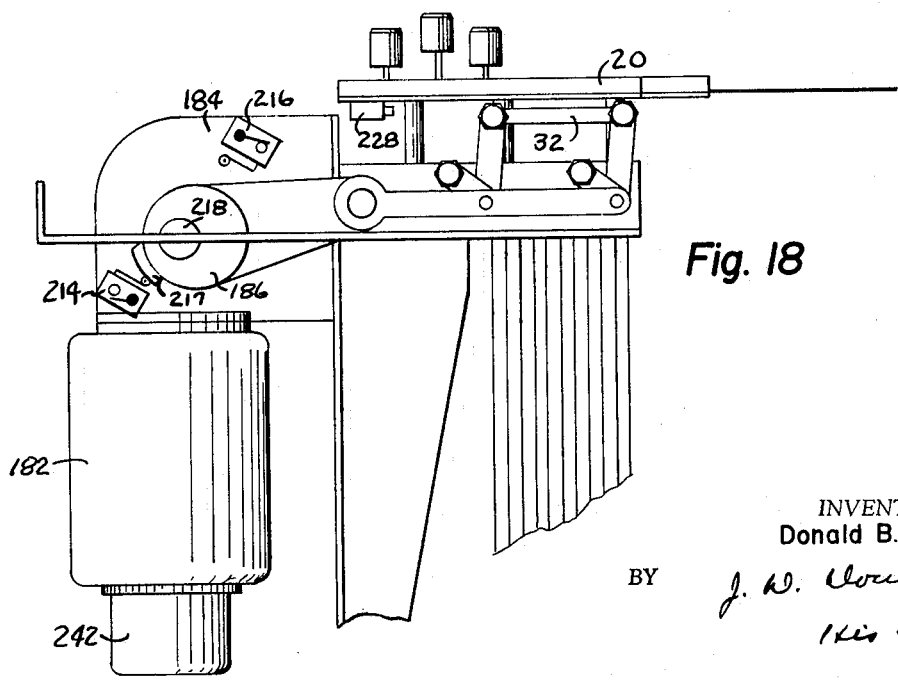
FIGURE 18 is a partial elevational view of the drive of FIGURE 17.

Refering now to FIGURES 17 through 21, a motor driven embodiment of this invention is shown. In this embodiment, the basic operation of the device is the same as previously described except the drive mechanism is replaced by a motor and electrical circuit for operating the motor. As can be seen in FIGURES 17 and 18, a motor 182 is provided which is drivingly connected to a gearhead 184 which, in turn, has an eccentric drive connection 186 drivingly connected to the parallelogram linkage for moving the retractor plate 32. The motor 182 is connected to an electrical circuit which is actuable by a switch connected to the sensing rod 42a. Since the sensing rod 42a is normally provided with a switch secured to the planar switching boards this switch can be used and is designated in FIGURES 19 and 20 as switch 36a. The actuation of the switch 36a and the circuit is controlled by movement of the pin 42a which pin is actuated differently than in the manually operated embodiment. In this embodiment, as can best be seen in FIGURES 19 and 20, a catch 188 is mounted for pivotal movement on a support wall 190 secured to the support plate 10. The catch 188 has a notch 192 which is disposed to engage the extension 64 of the arm 66 secured to the pin 68 (the pin 68 is secured to the rod 42a by clamp 70 just as in the manually operated embodiment). The catch 188 is normally biased by spring 194 toward the arm 66. An L-shaped arm 196 is pivotally mounted on the support wall 190 by pivot pin 198. The arm 196 is an extension of arm 66. Spring 200 extends between the arm 196 and ear 201 on the support wall 190 and normally biases the arm 196 in a clockwise direction. This urges the pin 66 upwardly, thus urging the sensing rod upwardly. When the notch 192 of the catch 188 engages the arm 66, as shown in FIGURE 19, this upward movement is prevented. The catch 188 is operable by a solenoid 202 connected thereto by an armature 203 which solenoid, when actuated, will release the catch from the arm 66 by pivoting it clockwise. This will allow the sensing rod to move upwardly under the urging of spring 200. When the rod 42a senses the locating perforated area in the card, it will move upwardly into aperture 30 in the top plate 20 under the urging of spring 200 and move switch 36a to operate the circuit shown schematically in FIGURE 21.

Figure 21:
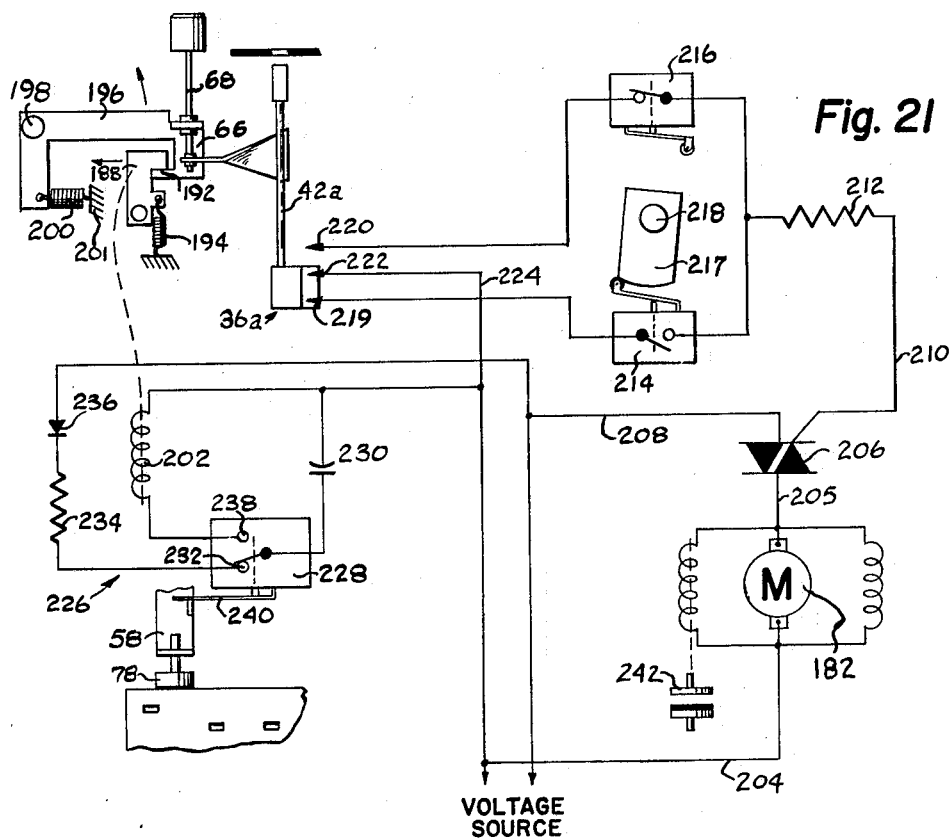
FIGURE 21 is a circuit diagram of the circuitry operating the embodiment of FIGURES 17-20.

Referring now to FIGURE 21, the motor 182 is connected to one side of a voltage source by conductor 204 and to the other side of the voltage source by a conductor 205 through a bilateral thyristor commonly known as a triac 206 and a conductor 208. The triac 206 is a semi-conducting device which acts as an electrical valve allowing the current to pass therethrough when and only when its gate electrode is subject to an electric potential. In the absence of an applied potential the triac will not allow current to pass. The actuation of the motor and therefore actuation of the retractor plate is controlled by controlling the potential applied to the gate electrode of the triac 206. To this end, the triac 206 is connected by conductor 210 to a resistor 212. The resistor 212 is connected to a pair of switches 214 and 216 operable by a cam 217 mounted on gear head drive shaft 218. The switch 214 is connected to contact 219 on one side of switch 36a and the switch 216 is connected to contact 220 on the other side of the switch 36a. The central contact 222 of the switch 36a is connected by conductor 224 to the one side of a voltage source. The switch 36a is actuatable by a solenoid circuit designated generally as 226. The solenoid circuit 226 includes a single pole double throw switch 228. The common side of the switch 228 is connected through capacitor 230 to one side of the voltage source. One of the contacts 232 of the switch is connected through a resistor 234 and a diode 236 to the opposite side of the voltage source. The other contact 238 of the switch 228 is connected through the solenoid 202 to the same side of the line as the capacitor is connected. As was indicated previously, the solenoid 202 is mechanically connected to the catch 188 and when energized will pivot the catch 188 out of engagement with arm 66 allowing the pin 68 to move upwardly under the urging of spring 200 moving sensing rod 42a with it. The switch 228 is connected to the actuating slide 58 by switch arm 240. Actuating slide 58 is moveable by a card pressing against either stop buttons 78 or 82, which will move switch arm 240.

OPERATION OF MOTORIZED EMBODIMENT

With the device in the position shown schematically in FIGURE 21, the triac 206 is to be connected through switch 214 now open to contacts 219 and 222. Since the switch 214 is open, no bias will be applied to the triac 206 and hence current will not flow therethrough and the motor will be stationary. When a card is placed in the card receiving groove and bears against one of the stop buttons it will move the slide 58 which will cause the switch arm 240 to move the switch 228 from contact 232 to contact 238. This will cause a circuit to be closed between the capacitor 230 and the solenoid 202. Since the capacitor has been charged by current through the diode 236 and resistor 234, the closed circuit will cause the capacitor 230 to discharge through the solenoid 202 thus momentarily energizing the solenoid for the period of discharge of the capacitor. When the solenoid is energized for this short period, it will pivot the catch 188 out of engagement with the arm 66 and the arm 196 under the bias of the spring 200 will cause the pin 68 to move upwardly which will cause the sensing rod 42a also to move upwardly toward the card receiving slot 25. A previously punched locating hole will be aligned with the sensing rod 42a which will cause the rod to pass therethrough into the aperture 30 in the top plate 20 and cause the switch 36a to switch to close contacts 222 and 220. Since switch 216 is closed, a potential will now be applied to the gate electrode of triac 206 through conductor 210 which will thus cause current to flow through the triac from the line to the motor and start the motor rotating. The cam 217 is so shaped and positioned that it will close switch 214 shortly after the motor starts running and also will leave switch 216 closed. The motor will continue running until it has caused the drive shaft 218 to have rotated 180° at which point the retractor plate 32 will have been moved to its actuating position by movement of the eccentric drive 186 from its full rearward position shown in FIGURE 18 to its full forward position. After 180° of rotation the cam 217 will open switch 216. This will remove the potential from the gate electrode of the triac 206 which will then prevent current from flowing to the motor which will shut the motor off. The motor is provided with a brake 242 of a conventional type which will stop the motor in the absence of a current but will allow the motor to run in the presence of a current. This type of solenoid operated brake is well known in the art. Hence, as soon as switch 216 is opened after 180° revolution of the gear head drive shaft, the motor will stop rotating and the retractor plate 32 will have been raised to its actuating position where it stays until the rod 42a is depressed. When this happens, the switch 36a is moved between contacts 219 and 222. The switch 214, which had been closed during the cycle of rotation to the actuating position, will cause a potential to be applied to the gate electrode of the triac which will then allow current to flow to the motor and the motor will be energized again. This will start the drive shaft rotating, and immediately upon rotation, the switch 216 will first be closed and after 180° of rotation of the shaft 218 the cam 217 will open switch 214 which will remove the potential from the triac causing current to cease to flow to the motor and the brake 242 will stop the motor, after this second 180° revolution. This will move the retractor plate to its retracted position by movement of the eccentric drive from its full forward position to its full rearward position. When the rod 42a was depressed, the catch 188 was spring biased into engagement with the arm 64 on the bracket 66 to maintain it in the depressed position. It will be noted that even though the switch 228 is connected through contact 238 to the solenoid, the capacitor 230 has not been recharged, and hence, the solenoid will not act to release the catch until it has been recharged. The capacitor can only be recharged when the card is removed which allows the switch arm 240 of switch 228 to move to contact 232, thus recharging it and readying it for the next cycle.

While several embodiments of this invention have been shown and described various adaptations and modifications can be made without departing from the scope of the appended claims.

What is claimed is:

1. A switching device controlled by a card having perforate and imperforate areas comprising, support means defining a plane providing a fixed card support surface, said support means having apertures therein extending from the card support surface, actuating rods slidably disposed in said apertures, biasing means operably connected to each of said rods urging each rod toward the card support surface, retractor means operably connected to said rods and having a retracted position wherein the ends of said rods are maintained closely spaced from card support surface and an actuating position wherein the end of each of said rods is movable past the card support surface under the urging of its biasing means when the rod encounters a perforate area of the card, and switch means operably connected to each of said rods, each of said switch means being movable from a first position to a second position when the end of its respective rod passes the card support surface a predetermined distance, whereby movement of said retractor means from its retracted position to its actuating position will cause switching of each of the switch means whose respective rod ends sense a perforate area of the card and pass through said area past the plane of the card and prevent switching of each of the switch means whose respective rod ends sense an imperforate area of the card, motor means and control means disposed to selectively drive said retractor means between its position, card location sensing means, means operably connected to said card location sensing means disposed to actuate said motor to drive said retractor means to its actuated position when a given card location is sensed, and means to selectively actuate said motor to drive said retractor means to its retracted position, circuit means actuatable selectively to energize said motor to drive the retractor means from its retracted position to its actuated position and then de-energize the motor, and to engage said motor to drive said retractor means from its actuated position to its retracted position and then de-energize said motor, said circuit means including a bilateral thyristor in circuit relationship with said motor and cam operated switch means in circuit relationship with said thyristor.

2. The combination of claim 1 further characterized by said sensing means including rod means moveable toward and away from the card support surface, and wherein said circuit means includes switch means actuatable by movement of said rod means past the card support surface, and card responsive solenoid actuated detent means disposed to releasably engage said rod means, whereby when a card is inserted said detent means will release said rod means, and if said rod means senses a perforate area in the card it will move its associated switch means to engage said motor.

3. The combination of claim 2 wherein said circuit means includes capacitor means disposed in circuit relationship with said solenoid and disposed to be selectively charged and selectively discharged through the solenoid.

4. The combination of claim 3 wherein said circuit means includes switch means disposed to maintain the circuit in a condition to charge said capacitor responsive to the absence of a card and maintain the circuit in a condition to discharge said capacitor responsive to the presence of a card.

(References on following page)

References Cited

UNITED STATES PATENTS

| | | |
|---|---|---|
| 2,814,438 | 11/1957 | Manning. |
| 2,869,790 | 1/1959 | Radke et al. |
| 3,034,711 | 5/1962 | Cohen. |
| 3,139,519 | 6/1964 | Reinschmidt. |
| 3,191,007 | 6/1965 | Mixer. |
| 3,267,260 | 8/1966 | Baker et al. |
| 3,294,957 | 12/1966 | Young _____ 200—46 X |

ROBERT K. SCHAEFER, Primary Examiner

D. SMITH, Jr., Assistant Examiner

U.S. Cl. X.R.

235—61.11